(12) United States Patent
Mather et al.

(10) Patent No.: US 10,235,792 B2
(45) Date of Patent: Mar. 19, 2019

(54) GRAPHICS PROCESSING SYSTEMS

(71) Applicant: ARM Limited, Cambridge (GB)

(72) Inventors: Alexis Mather, Cambridge (GB); Sean Ellis, Cambridge (GB)

(73) Assignee: Arm Limited, Cambridge (GB)

( * ) Notice: Subject to any disclaimer, the term of this patent is extended or adjusted under 35 U.S.C. 154(b) by 10 days.

(21) Appl. No.: 14/700,026

(22) Filed: Apr. 29, 2015

(65) Prior Publication Data

US 2015/0317763 A1 Nov. 5, 2015

(30) Foreign Application Priority Data

May 2, 2014 (GB) .................................. 1407753.1

(51) Int. Cl.
*G06T 1/20* (2006.01)
*G06T 15/00* (2011.01)
*G06T 1/60* (2006.01)

(52) U.S. Cl.
CPC .............. *G06T 15/005* (2013.01); *G06T 1/60* (2013.01)

(58) Field of Classification Search
CPC .................................. G06T 1/20; G06F 15/76
USPC ........................................ 345/506, 556, 557
See application file for complete search history.

(56) References Cited

U.S. PATENT DOCUMENTS

| | | | |
|---|---|---|---|
| 6,501,480 B1 * | 12/2002 | MacInnis ................. | G06T 9/00 345/503 |
| 6,784,889 B1 * | 8/2004 | Radke ..................... | G09G 5/39 345/506 |
| 6,900,810 B1 * | 5/2005 | Moreton ............... | G06T 15/005 345/506 |
| 7,382,377 B1 | 6/2008 | Everitt et al. | |
| 7,388,588 B2 * | 6/2008 | D'Amora .............. | G06F 9/3879 345/503 |
| 7,564,456 B1 | 7/2009 | Lindholm et al. | |
| 8,310,482 B1 | 11/2012 | Hakura et al. | |
| 8,704,826 B1 | 4/2014 | Hakura et al. | |
| 2004/0179018 A1 * | 9/2004 | Sabella .................. | G09G 5/393 345/536 |
| 2005/0024367 A1 * | 2/2005 | Radke ..................... | G09G 5/39 345/533 |
| 2006/0050077 A1 * | 3/2006 | D'Amora .............. | G06F 9/3879 345/567 |

(Continued)

FOREIGN PATENT DOCUMENTS

| | | |
|---|---|---|
| WO | WO 00/10372 A2 | 3/2000 |
| WO | WO 2011/103258 A2 | 8/2011 |

OTHER PUBLICATIONS

UK Search Report dated Oct. 28, 2014, UK Patent Application GB1407753.1.

(Continued)

*Primary Examiner* — Phong X Nguyen
(74) *Attorney, Agent, or Firm* — Vierra Magen Marcus LLP

(57) ABSTRACT

A tile based graphics processing pipeline comprises a plurality of processing stages, including at least a rasterizer that rasterizes input primitives to generate graphics fragments to be processed, and a renderer that processes fragments generated by the rasterizer to generate rendered fragment data, and a processing stage 6 operable to receive rendered fragment data 3, and to perform a processing operation using the rendered fragment data to generate per-tile metadata 7.

15 Claims, 8 Drawing Sheets

(56) References Cited

U.S. PATENT DOCUMENTS

| | | | |
|---|---|---|---|
| 2006/0080553 A1* | 4/2006 | Hall | G06F 12/0875 |
| | | | 713/189 |
| 2006/0267981 A1 | 11/2006 | Naoi | |
| 2008/0012878 A1* | 1/2008 | Nystad | G06T 11/001 |
| | | | 345/613 |
| 2008/0273032 A1* | 11/2008 | Brennan | G06T 1/60 |
| | | | 345/421 |
| 2009/0167772 A1* | 7/2009 | Falchetto | G06T 15/405 |
| | | | 345/506 |
| 2010/0254621 A1* | 10/2010 | Wennersten | G06T 9/00 |
| | | | 382/235 |
| 2011/0102446 A1* | 5/2011 | Oterhals | G06T 11/40 |
| | | | 345/545 |
| 2011/0148876 A1 | 6/2011 | Akenine-Moller | |
| 2011/0193868 A1* | 8/2011 | MacInnis | G06T 9/00 |
| | | | 345/501 |
| 2012/0206455 A1* | 8/2012 | Shreiner | G06T 15/005 |
| | | | 345/420 |
| 2012/0293519 A1* | 11/2012 | Ribble | G06T 15/005 |
| | | | 345/501 |
| 2012/0293545 A1* | 11/2012 | Engh-Halstvedt | G06T 15/40 |
| | | | 345/629 |
| 2013/0258358 A1* | 10/2013 | Qian | G06K 15/1813 |
| | | | 358/1.8 |
| 2013/0328873 A1 | 12/2013 | Harada et al. | |
| 2015/0287166 A1* | 10/2015 | Cerny | G02B 27/0172 |
| | | | 345/423 |

OTHER PUBLICATIONS

Banterle, "A GPU-friendly method for high dynamic range texture compression using inverse tone mapping," University of Warwick, May 2008.

Bellens, "Parallel Implementaion of the Integral Histogram," ACIVS 2011.

Scheuermann, "Efficient Histogram Generation Using Scattering on GPUs," Advanced Micro Devices, Inc., ACM I3D 2007 Conference Proceedings.

Diao, et al., "Multimedia Mining on Manycore Architectures: The Case for GPUs," Published in: Proceeding ISVC '09 Proceedings of the 5th International Symposium on Advances in Visual Computing: Part II, pp. 619-630, Nov. 26, 2009.

Fluck, et al., "GPU Histogram Computation," Published in: Proceeding SIGGRAPH '06 ACM SIGGRAPH, Research posters Article No. 53, Jul. 30, 2006.

* cited by examiner

GRAPHICS PROCESSING SYSTEMS

BACKGROUND

The technology described herein relates to graphics processing systems, and in particular to tile-based graphics processing systems.

As is known in the art, graphics processing is normally carried out by first dividing the output to be generated, such as a frame to be displayed, into a number of similar basic components (so called "primitives") to allow the graphics processing operations to be more easily carried out. These "primitives" are usually in the form of simple polygons, such as triangles.

The graphics primitives are usually generated by the applications program interface for the graphics processing system, using the graphics drawing instructions (requests) received from the application (e.g. game) that requires the graphics output.

Each primitive is at this stage usually defined by and represented as a set of vertices. Each vertex for a primitive has associated with it a set of data (such as position, colour, texture and other attributes data) representing the vertex. This data is then used, e.g., when rasterising and rendering the vertex (the primitive(s) to which the vertex relates) in order to generate the desired output of the graphics processing system.

Once primitives and their vertices have been generated and defined, they can be processed by the graphics processing system, in order, e.g., to display the frame.

This process basically involves determining which sampling points of an array of sampling points covering the output area to be processed are covered by a primitive, and then determining the appearance each sampling point should have (e.g. in terms of its colour, etc.) to represent the primitive at that sampling point. These processes are commonly referred to as rasterising and rendering, respectively.

The rasterising process determines the sample positions that should be used for a primitive (i.e. the (x, y) positions of the sample points to be used to represent the primitive in the output, e.g. scene to be displayed). This is typically done using the positions of the vertices of a primitive.

The rendering process then derives the data, such as red, green and blue (RGB) colour values and an "Alpha" (transparency) value, necessary to represent the primitive at the sample points (i.e. "shades" each sample point). This can involve, as is known in the art, applying textures, blending sample point data values, etc.

(In graphics literature, the term "rasterisation" is sometimes used to mean both primitive conversion to sample positions and rendering. However, herein "rasterisation" will be used to refer to converting primitive data to sampling point addresses only.)

These processes are typically carried out by testing sets of one, or of more than one, sampling point, and then generating for each set of sampling points found to include a sample point that is inside (covered by) the primitive in question (being tested), a discrete graphical entity usually referred to as a "fragment" on which the graphics processing operations (such as rendering) are carried out. Covered sampling points are thus, in effect, processed as fragments that will be used to render the primitive at the sampling points in question. The "fragments" are the graphical entities that pass through the rendering process (the rendering pipeline). Each fragment that is generated and processed may, e.g., represent a single sampling point or a set of plural sampling points, depending upon how the graphics processing system is configured.

(A "fragment" is therefore effectively (has associated with it) a set of primitive data as interpolated to a given output space sample point or points of a primitive. It may also include per primitive and other state data that is required to shade the primitive at the sample point (fragment position) in question. Each graphics fragment may typically be the same size and location as a "pixel" of the output (e.g. output frame) (since as the pixels are the singularities in the final display, there may be a one to one mapping between the "fragments" the graphics processor operates on (renders) and the pixels of a display). However, it can be the case that there is not a one to one correspondence between a fragment and a display pixel, for example where particular forms of post processing, such as downsampling, are carried out on the rendered image prior to displaying the final image.)

(It is also the case that as multiple fragments, e.g. from different overlapping primitives, at a given location may affect each other (e.g. due to transparency and/or blending), the final pixel output may depend upon plural or all fragments at that pixel location.)

(Correspondingly, there may be a one to one correspondence between the sampling points and the pixels of a display, but more typically there may not be a one to one correspondence between sampling points and display pixels, as downsampling may be carried out on the rendered sample values to generate the output pixel values for displaying the final image. Similarly, where multiple sampling point values, e.g. from different overlapping primitives, at a given location affect each other (e.g. due to transparency and/or blending), the final pixel output will also depend upon plural overlapping sample values at that pixel location.)

As is known in the art, in tile-based rendering, rather than the entire render output, e.g., frame, effectively being processed in one go as in immediate mode rendering, the render output, e.g., frame to be displayed, is divided into a plurality of smaller sub-regions, usually referred to as "tiles". Each tile (sub-region) is rendered separately (typically one-after-another), and the rendered tiles (sub-regions) are then recombined to provide the complete render output, e.g., frame for display. In such arrangements, the render output is typically divided into regularly-sized and shaped sub-regions (tiles) (which are usually, e.g., squares or rectangles), but this is not essential.

As is known in the art, graphics processing systems and graphics processors are typically provided in the form of graphics processing pipelines which have multiple processing stages for performing the graphics processing functions, such as fetching input data, geometry processing, vertex shading, rasterisation, rendering, etc., necessary to generate the desired set of output graphics data (which may, e.g., represent all or part of a frame to be displayed).

The processing stages of the graphics processing pipeline may, e.g., be in the form of fixed-function units (hardware), or some or all of the functional units may be programmable (be provided by means of programmable circuitry that can be programmed to perform the desired operation). For example, a graphics processing pipeline may include programmable vertex and/or fragment shaders for performing desired vertex and/or fragment shading operations.

A tile-based graphics processing pipeline will typically also include one or more so called tile buffers that store rendered fragment data at the end of the pipeline until a given tile is completed and written out to an external memory, such as a frame buffer, for use. This local, pipeline memory is used to retain fragment data locally before the data is finally exported to external memory.

In order to facilitate the writing back of rendered graphics data from the tile buffers to external memory, such as a frame buffer, a graphics processing pipeline will typically include write out circuitry coupled to the tile buffer pipeline memory for this purpose. The graphics processing pipeline may also be provided with fixed function downsampling circuitry for downsampling the locally stored data before it is written out to external memory where that is required (as may, e.g., be the case where a frame to be displayed is rendered in a supersampled or multisampled manner for anti aliasing purposes).

In graphics processors in lower power and portable devices, the bandwidth cost of writing data to external memory from the graphics processing pipeline and for the converse operation of reading data from external memory to the local memory of the graphics processing pipeline can be a significant issue. Bandwidth consumption can be a big source of heat and of power consumption, and so it is generally desirable to try to reduce bandwidth consumption for external memory reads and writes in graphics processing systems.

The Applicants believe that there remains scope for further improvements for reducing bandwidth consumption by graphics processing systems, and in particular by tile-based graphics processing systems.

BRIEF DESCRIPTION OF THE DRAWINGS

Various embodiments of the technology described herein will now be described by way of example only and with reference to the accompanying drawings, in which.

Like reference numerals are used for like components in the drawings, where appropriate.

DETAILED DESCRIPTION

Figure 1:
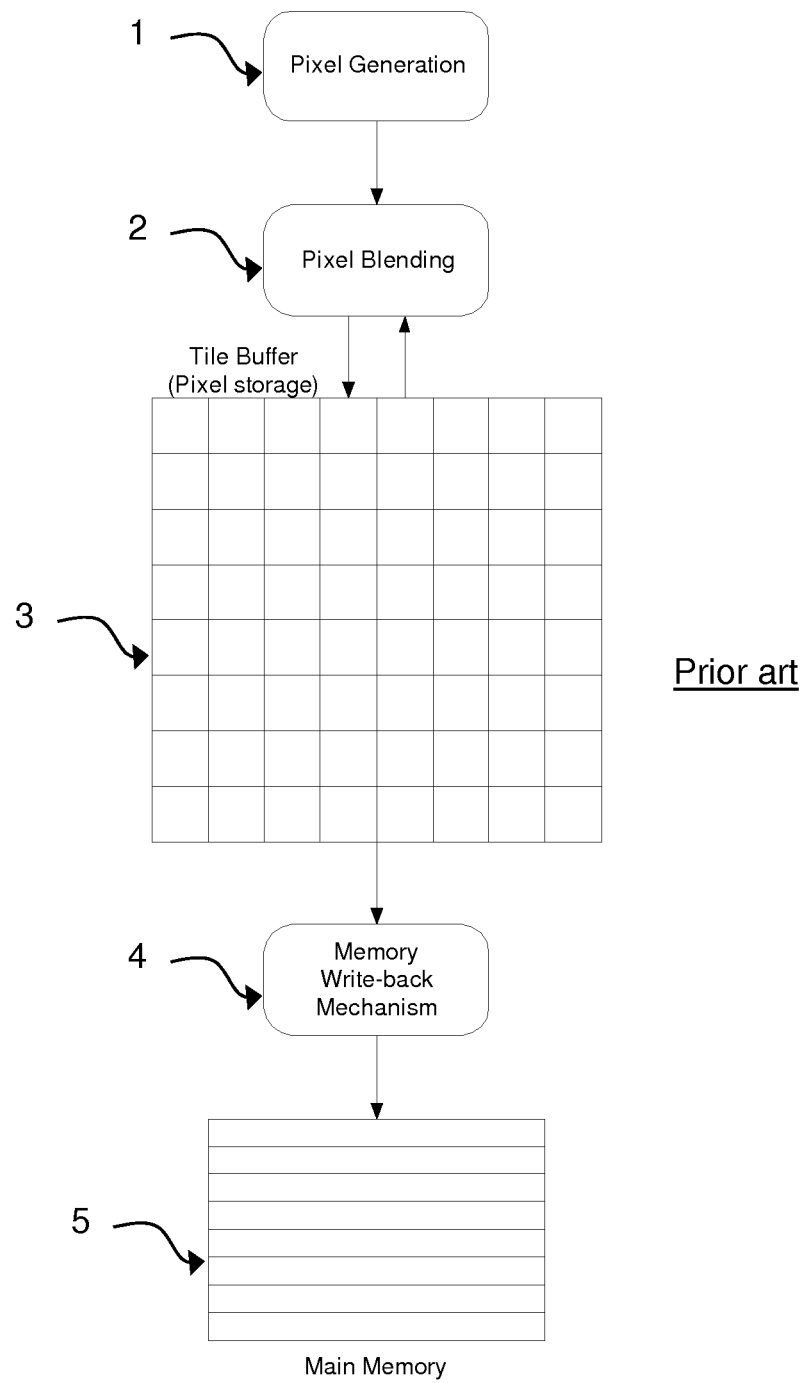
FIG. 1 shows schematically a conventional graphics processing system.

A first embodiment of the technology described herein comprises a tile based graphics processing pipeline comprising:
  a plurality of processing stages, including at least a rasteriser that rasterises input primitives to generate graphics fragments to be processed, and a renderer that processes fragments generated by the rasteriser to generate rendered fragment data; and
  a processing stage operable to receive rendered fragment data, and to perform a processing operation using the rendered fragment data to generate per-tile metadata.

A second embodiment of the technology described herein comprises a method of operating a tile based graphics processing pipeline that comprises:
  a plurality of processing stages, including at least a rasteriser that rasterises input primitives to generate graphics fragments to be processed, and a renderer that processes fragments generated by the rasteriser to generate rendered fragment data; and
  a processing stage operable to receive rendered fragment data, and to perform a processing operation using the rendered fragment data to generate per-tile metadata;
  the method comprising:
    the processing stage performing a processing operation using rendered fragment data to generate per-tile metadata.

The graphics processing pipeline of the technology described herein includes a processing stage operable to receive rendered fragment data, and to perform a processing operation using the rendered fragment data to generate per-tile metadata.

As is known in the art, per-tile metadata, i.e. data that describes some aspect of a tile of rendered graphics data, is useful in and generated for various graphics processing operations. For example, one common technique involves, for each tile of the rendered graphics data, generating a histogram of the brightness of the pixels within the tile. The histograms can then be used, e.g., to control the brightness of a backlit display screen.

However, in prior art methods, per-tile metadata is generated once all of the tiles for a frame have been generated and written out to the external memory (e.g. to the frame buffer). The generation of per-tile metadata in these methods typically involves reading all or some of the rendered graphics data from the external memory, processing the data to generate per-tile metadata, and then writing the per-tile metadata back to the external memory (or using it in some other way). However, the bandwidth cost of reading the rendered graphics data from the external memory and/or writing the per-tile metadata data to the external memory can be relatively high.

Providing a processing stage that is operable to generate per-tile metadata in the manner of the technology described herein enables the per-tile metadata to be generated within the graphics processing pipeline (i.e. within the graphics processor, or "on-chip"). This then means that there is no need for the graphics processor to subsequently read the rendered graphics data from the external memory in order to generate the per-tile metadata. Furthermore, in graphics processing operations in which only the metadata is required for further processing (i.e. where the rendered graphics data is not itself required), the writing of the rendered graphics data to the external memory can be avoided. (One example of such an operation is a multisample resolve, where multiple samples of data are averaged, and then the data are discarded. Another example is where the per-tile metadata is generated from rendered fragment data which is not (normally) written out to the external memory at all, such as depth values.)

Thus, the operation of the technology described herein can allow per-tile metadata to be generated in a much more bandwidth conservative way by eliminating the need for reads and writes to external memory. This in turn can lead to increased system performance and reduced power consumption.

The rasteriser of the graphics processing pipeline will, as is known in the art, generate graphics fragments to be rendered, in an embodiment to generate rendered graphics data for sampling points of the desired graphics output, such as a frame to be displayed. Each graphics fragment that is generated by the rasteriser in an embodiment has associated with it a set of sampling points of the graphics output and is to be used to generate rendered graphics data for one or more of sampling points of the set of sampling points associated with the fragment.

The rasteriser may be configured to generate the fragments for rendering in any desired and suitable manner. It will, as is known in the art, receive e.g. primitives to be rasterised, test those primitives against sets of sampling point positions, and generate fragments representing the primitives accordingly.

The renderer should in an embodiment process the fragments generated by the rasteriser to generate rendered fragment data for (covered) sampling points that the fragments represent, as is known in the art. These rendering processes may include, for example, fragment shading, blending, texture-mapping, etc. In an embodiment the renderer is in the form of or includes a programmable fragment shader.

The plurality of processing stages should in an embodiment generate rendered fragment data in respect of (for) one or more individual tiles, in an embodiment in a sequential manner (i.e. all of the rendered fragment data for one tile should be generated before generating the data for the next tile), as is known in the art.

The processing stage that processes the rendered fragment data to generate the per-tile metadata may comprise any suitable processing stage. The processing stage may be provided as a separate circuit element to other stages of the processing pipeline. However, it may also be at least partially formed of shared graphics processing circuitry.

In an embodiment, the processing stage may receive the rendered fragment data in the form as generated and output by the renderer. However, in other embodiments, the rendered fragment data will undergo one or more further processing operations within the graphics processing pipeline before being received by the processing stage. The received rendered fragment data should comprise rendered fragment data that has been generated (and received from) within the graphics processing pipeline (generated by the plurality of processing stages), i.e. data that has not (yet) been written out to external memory.

The processing stage that generates the per-tile metadata in an embodiment receives data for a plurality of fragments, e.g. data for a plurality of sampling positions within a tile, in an embodiment data for all sampling positions within a tile (and in one embodiment, data for sampling positions within a plurality of tiles), as inputs to its processing operation. The processing stage may receive one or more types of rendered fragment data (e.g. colour values, depth values, etc.) generated by the renderer as inputs to its processing operation.

In an embodiment, the processing stage is operable to receive rendered fragment data from one or more memories or buffers configured to store the rendered fragment data locally to the graphics processing pipeline, e.g. by reading the data from the one or more memories or buffers.

For example, the graphics processing pipeline may (and in an embodiment does) further comprise one or more tile buffers configured to store (one or more types of) rendered fragment data in respect of one or more tiles locally to the graphics processing pipeline, e.g. prior to (some of) that data being written out to external memory (although, as discussed below, it is not necessary that the rendered fragment data is written out to external memory), and the processing stage may be operable to receive rendered fragment data from the one or more tile buffers, e.g. by reading the data from the one or more tile buffers. (The one or more tile buffers in an embodiment store, as is known in the art, an array or arrays of rendered fragment data values for the tile in question. The rendered fragment data values may, e.g., comprise colour values (a colour buffer), depth values (a depth buffer), etc.)

In one embodiment, the processing stage is operable to receive rendered fragment data as it is being written to external memory, e.g. from the one or more tile buffers. For example, the data requested from the one or more tile buffers during a memory write back operation may be used as input data to the processing stage.

Additionally or alternatively, the processing stage may be operable to receive rendered fragment data (directly) from the upstream stages of the graphics processing pipeline (i.e. from the plurality of processing stages), e.g., in a pipelined manner. In other words, in embodiments, the processing stage is arranged in the graphics processing pipeline to receive data for individual fragments as they are passed through the pipeline.

For example, in an embodiment the processing stage is operable to receive the rendered fragment data as it is being written to the tile buffer. Furthermore, in embodiments where the process of writing the rendered fragment data to the one or more tile buffers involves reading values from the one or more tile buffers (e.g., where new rendered fragment data to be written to the one or more tile buffers is to be, e.g., blended with existing rendered fragment data already stored in the one or more tile buffers), the processing stage may additionally be configured to receive and process (the appropriate) rendered fragment data (e.g. by reading it) from the one or more tile buffers.

In an embodiment, the processing stage is provided as a programmable processing stage, e.g. by means of programmable circuitry that can be programmed to perform the desired operation. This can then provide a relatively high degree of flexibility, e.g., as to the particular selection of input data, the particular processing operation performed by the processing stage (and therefore the particular type of per-tile metadata to be generated), and the handling of the output data.

In one embodiment, the programmable processing stage is operable to receive rendered fragment data by (directly) reading data stored in the tile buffer. In this embodiment, rendered fragment data values generated within the graphics processing pipeline and stored within the tile buffers are in an embodiment processed by the programmable processing stage to provide the per-tile metadata. The programmable processing stage in an embodiment has access to all the data values stored in the tile buffer, in an embodiment on a "random access" basis. This facilitates enhanced flexibility in the processing operation that generates the per-tile metadata.

In an embodiment, the programmable processing stage comprises programmable graphics processing circuitry that executes respective graphics processing threads (under the control of graphics program instructions). In an embodiment, the programmable processing stage operates in a similar manner to other programmable stages of the processing pipeline, such as a fragment shader, but is able to read (and in an embodiment write to) the tile buffer (directly).

In another embodiment, the processing stage may be in the form of a fixed-function unit (hardware), i.e. a processing stage that is dedicated to one or more functions that cannot be changed. While providing the processing stage as a programmable processing stage can provide more flexibility as discussed above, providing the processing stage as a fixed-function unit represents a particularly simple and efficient mechanism for generating the per-tile metadata within the graphics processing pipeline (i.e. on chip), and can further reduce the processing (and therefore power and bandwidth) requirements of the graphics processing system. This is because, e.g., a fixed-function unit is typically smaller and uses less power than a more general-purpose unit, and there is no need for the graphics processing system to generate and execute instructions for the programmable processing stage.

Equally, these embodiments can avoid extending the lifetime of the tile buffer, which will typically occur in embodiments where the processing stage is a programmable processing stage that accesses the tile buffer on a "random access" basis.

Furthermore, in embodiments where the processing stage is operable to receive rendered fragment data as it is being written to the tile buffer, or as it is being written to external memory (e.g. from the tile buffer), the number of processing (e.g. read) operations within the graphics processing pipeline can be further reduced, e.g. because many of the required (e.g. read) operations will already necessarily take place in the normal operation of the pipeline. This is because the pipeline must necessarily read the data that it is going to write to the tile buffer or to external memory, and it is relatively easy to duplicate this data and to input it to the processing stage. Accordingly, the amount of additional processing required within the graphics processing pipeline to generate the per-tile metadata can be minimised.

In an embodiment, a single fixed-function unit is provided and used to generate the per-tile metadata. However, in another embodiment, a plurality of fixed-function units are provided, and each fixed-function unit is in an embodiment configured to generate a different type of per-tile metadata. By using multiple fixed-function units in this manner, multiple pieces and/or types of per-tile metadata can be generated at the same time (i.e. in parallel), in a particularly efficient and convenient manner (e.g. when compared with using one or more programmable processing stages).

The processing operation performed by the processing stage may be any suitable and desired processing operation that generates per-tile metadata. The processing operation is in an embodiment performed using (some or all of) the rendered fragment data generated in respect of (for) an individual tile (i.e. using a tile of rendered fragment data). Thus, each piece of per-tile metadata is in an embodiment generated using (and is associated with) the rendered fragment data generated in respect of (for) an individual tile. In an embodiment, per-tile metadata is generated in respect of (for) (and associated with) each tile of a plurality of tiles that are, e.g. sequentially, generated in the graphics processing pipeline and/or that are generated in parallel across one or more graphics processing pipelines (such that a plurality of pieces or sets of per-tile metadata are in an embodiment (sequentially and/or in parallel) generated). For each tile, one or more pieces of per-tile metadata may be generated by one or more processing operations.

The processing operation may be performed once the processing stage has received (all of) the rendered fragment data for the tile in question, and/or it may be performed ("dynamically") while (i.e. at the same time as) the processing stage is receiving the rendered fragment data for the tile in question. For example, the processing operation may be performed by processing data for each fragment as it is received, and by keeping a running total of the calculated value of the metadata (e.g. in a local cache or buffer), i.e. the processing operation may be performed "on-the-fly". This then means that the value of the per-tile metadata may be available at an earlier stage in the processing than would otherwise be the case if the processing operation were performed once the processing stage has received all of the rendered fragment data for the tile in question. This may be particularly useful where, for example, the processing operation involves updating a histogram with values derived from each fragment.

In one embodiment, the processing stage is operable to receive and process (only) "fresh" rendered fragment data for each respective tile generated by the renderer, i.e. the processing stage is configured to reset itself before processing each new tile. Alternatively, the processing stage may be operable to load some previously generated data, e.g. from external memory, before processing a or each tile. This can facilitate, for example, accumulation of data for several tiles in a frame and/or several (e.g. corresponding) tiles from several frames.

The processing stage may optionally further comprise a local cache memory or buffer for storing data generated by the processing stage, such as the per-tile metadata itself, or intermediate data generated (e.g. working values) when performing the processing operation. (This may be used, e.g., to facilitate "on-the-fly" processing, as discussed above.) In an embodiment, the per-tile metadata, once generated, is stored in a local memory (i.e. local to the graphics processing pipeline).

In an embodiment, the processing stage is configured so as to recognise and correctly process input fragment data that does not comprise an integer number of tiles (i.e. where some tiles (e.g. at the edges of the image) are only partially populated with valid fragment data values), e.g. by recognising and only processing the valid fragment data values, and/or by altering the processing operation to take this into account. In an embodiment, this is done in a way that is relatively inexpensive to implement.

For example, as discussed below, in embodiments where the metadata comprises an average value of a particular characteristic or property of a tile, the processing operation will comprise summing the values of the characteristic or property of the tile, before dividing by the number of summed data values. Dividing by a fixed number is relatively simple to implement in hardware (especially if the number is a power of two), but dividing by an arbitrary number (as would be required for the case where average values for partially populated tiles are calculated) can be relatively expensive to implement in hardware.

Thus, such embodiments may comprise processing every tile (e.g. including partially populated tiles), in the same, fixed manner, and then correcting for any errors (e.g. due to partially populated tiles) in later processing. In one embodiment, this is done in software.

In an embodiment, any one or more of the above processing techniques may be provided for and/or used for the processing operation. In embodiments where more than one of the above processing techniques are provided for and/or used, then in an embodiment the graphics processing pipeline may be configured to be switchable between the various techniques as desired. In an embodiment, the graphics processing pipeline may be controlled to perform a particular processing operation using the most efficient processing technique.

For example, in processes where each pixel is updated multiple times during writing of the rendered fragment data to the tile buffer, performing the processing operation using fragments received as they are being written to the tile buffer may be relatively expensive, e.g. when compared with performing the processing operation using the rendered fragment data received by reading the (final) stored values from the tile buffer. However, the former technique may be more appropriate for other processes (i.e. when compared with reading the entire contents of the tile buffer and performing the processing operation using all of the data). By choosing the most efficient technique for the processing operation in question, further savings in power and bandwidth can be achieved.

The tiles that the metadata is generated for should comprise, and in an embodiment are, the tiles that the graphics processing pipeline operates on (e.g. is producing as its rendering output). Thus, in an embodiment they each comprise a rectangular (including square) array of plural sampling positions (data positions), such as 16×16, 8×16, 16×8, or 32×32 sampling positions.

The per-tile metadata that is generated by the processing operation may be any suitable and desired metadata that can be derived from and associated with an individual tile.

In one embodiment, the processing operation generates per-tile metadata in the form of a histogram. A histogram may be generated, for example, by counting the number of regions (e.g. sampling positions or groups of sampling positions) within a tile having a value of a particular characteristic (e.g. that falls within each bin of the histogram). The number of bins used, and/or the ranges for each of the bins can be chosen as desired, and should in an embodiment be supplied to the processing stage that generates the metadata.

Additionally or alternatively, the per-tile metadata may take the form of a bitmap or a bitmask, e.g. indicative of regions (e.g. sampling positions or groups of sampling positions) of a tile having a particular characteristic.

In one embodiment, the per-tile metadata may indicate minimum and/or maximum values of a particular characteristic or property of a tile or of regions (e.g. groups of sampling positions) within a tile. In this embodiment, the processing operation may comprise evaluating the rendered fragment data values for a tile, and determining the minimum and/or maximum values. In this embodiment, the per-tile metadata may take the form of one or more individual values.

In one embodiment, the per-tile metadata may indicate a total value of a particular characteristic or property of a tile. In this embodiment, the processing operation may comprise summing the relevant data values of a tile.

In one embodiment, the per-tile metadata may indicate an average value of a particular characteristic or property of a tile. In this embodiment, the processing operation may comprise summing data values for (all the) sampling positions of a tile, and then dividing the resultant value by the number of data values summed to generate an average value. As will be appreciated, the processing operation in this embodiment is equivalent to applying a box filter having the size of the tile.

In one embodiment, the per-tile metadata may take the form of a similarity flag, e.g. indicating whether all sampling positions within a tile have the same value of a particular characteristic or property. In another embodiment, the similarity flag may indicate whether all sampling positions within a tile have similar values of a particular characteristic or property. In this embodiment, the processing operation may comprise using a fixed or programmable threshold to generate the per-tile metadata (e.g. to be used to determine whether the sampling position values are to be considered to be similar or not).

In one embodiment, the per-tile metadata may comprise a modification flag, indicating whether or not a change (or only relatively small changes) has been made to the tile. For example, writing the rendered fragment data to the tile buffer may or may not change existing data stored in the tile buffer, and the per-tile metadata may indicate whether or not any such change (or only relatively minor changes) has been made. In this embodiment, the processing operation will comprise, e.g. determining whether a change (or a particular type of change) has been made to the tile, and if it is determined that a change has been made, setting the flag. This metadata may be used, e.g. to suppress the output of rendered fragment data (i.e. the tile) from the tile buffer, e.g. if there is no change (or only relatively few changes) between tiles.

In one embodiment, the per-tile metadata relates to the luminosity of regions (e.g. sampling positions or groups of sampling positions) within a tile (i.e., the particular characteristic or property may comprise luminosity). In one such embodiment, a histogram of the luminosity values of sampling positions (or pixels) of a tile is generated. As discussed above, this can be used. e.g., to control the brightness of a backlit display screen. In another embodiment, the per-tile metadata may comprise minimum and maximum values of luminance for a tile.

In another embodiment, the per-tile metadata relates to the transparency of regions (e.g. sampling positions or groups of sampling positions) of a tile (i.e. the particular characteristic or property may comprise transparency). In one such embodiment, the per-tile metadata may indicate whether all of a tile and/or whether regions (e.g. sampling positions or groups of sampling positions) of a tile are completely opaque, and/or are completely transparent and/or neither. Such information may be used, e.g., to control further graphics processing operation that are carried out on the tile. For example, further operations on the tiles and/or regions indicated as completely opaque and/or indicated as completely transparent may be skipped.

Alternatively, the per-tile metadata may indicate whether all of a tile and/or whether regions of a tile are similarly, e.g. "almost completely", opaque, and/or whether all of a tile and/or whether regions of a tile are similarly, e.g. "almost completely", transparent. Accordingly, in this embodiment, the processing operation that generates the per-tile metadata may use one or more fixed or programmable threshold values to generate the per-tile metadata. This information may be used in the manner discussed above to control further graphics processing operation that are carried out on the tile. This is possible because in some circumstances, the differences between "almost completely" opaque and fully opaque regions of a tile, and between "almost completely" transparent and fully transparent regions of a tile, may not be visible.

In these embodiments, the per-tile metadata may take the form of one or more histograms, or in an embodiment one or more bitmasks or flags, e.g. indicating the presence (or absence) of regions (sample positions or pixels) of the tile that are (completely and/or relatively) opaque and/or transparent and/or neither.

In one embodiment, the per-tile metadata relates to the depth of regions (e.g. sampling positions or groups of sampling positions) within a tile (i.e., the particular characteristic or property may comprise depth). For example, in one embodiment, the per-tile metadata may comprises minimum and maximum values of depth for a tile.

In one embodiment, the per-tile metadata relates to domain transformed information of a tile, such as frequency domain transformation information (i.e., the particular characteristic or property may comprise domain transformed information). In this embodiment, the processing operation may comprise transforming the tile data from a spatial grid into another domain, such as 2D spatial frequency, using DCT, wavelet or other similar techniques. In one such embodiment, the per-tile metadata comprises a histogram of frequency data. Such metadata may be used, e.g., in dynamic display processing, and/or encoding of display streams.

In one embodiment, the per-tile metadata relates to colour values within a tile (i.e., the particular characteristic or property may comprise colour). In one such embodiment, the per-tile metadata may comprise the average colour value of a tile. This metadata may be used, e.g., for ambient colour enhancement of the displayed image.

In various embodiments, multiple different types of per-tile metadata may be generated, e.g. from one or more passes over the rendered fragment data (e.g. stored in the tile buffer). Each piece of per-tile metadata may be written out to external memory separately or together.

Where each sampling position of a tile has plural data values (e.g. data channels) associated with it, then in one embodiment, the metadata is based on (e.g. calculated from) all the data values (data channels). However, it would also be possible to derive metadata for some but not all of the data channels, e.g. for a single data channel (e.g. colour) and/or separate metadata values could be generated for each data channel (e.g. colour channel).

It would also be possible to derive metadata for a set of plural tiles, if desired.

The metadata generation can in an embodiment be selectively enabled and/or disabled.

In an embodiment, the graphics processing pipeline further comprises a write out stage configured to (be able to) write the per-tile metadata to external memory, and the method further comprises a write out stage writing the per-tile metadata to external memory.

The external memory should be and is in an embodiment one or more memories external to the graphics processing pipeline, to which a write out stage can write data, such as a frame buffer. The external memory is in an embodiment provided as or on a separate chip (monolithic integrated circuit) to the graphics processing pipeline (i.e. to the graphics processor) (and as or on a separate chip to the chip (integrated circuit) on which the local memory (e.g. tile buffer) of the graphics processing pipeline resides). The external memory in an embodiment comprises a main memory (e.g. that is shared with the central processing unit (CPU)), e.g. a frame buffer, of the overall graphics processing system.

The write out stage may be configured to write out the per-tile metadata to the external memory in any suitable and desired manner.

In an embodiment, the results of the processing operation (i.e. the per-tile metadata) may be written out directly from the processing stage to the external memory. However, in another embodiment, the per-tile metadata is written out from a local cache memory or buffer of the processing stage in which the per-tile metadata is stored.

Alternatively, the metadata, once generated, may be firstly written to a or the tile buffer, before being written out from the tile buffer to the external memory. This may be advantageous where, for example, the metadata is relatively large and it is undesirable to store the metadata in a local cache memory or buffer of the processing stage. The metadata may, for example, be stored in empty regions of a or the tile buffer. Alternatively, the metadata data may be stored in the tile buffer by overwriting rendered fragment data that is not needed for further processing (e.g. rendered fragment data that has already been processed by the processing operation and that does not need to be written out).

In one embodiment, dedicated write-out circuitry for the processing stage that generates the per-tile metadata is provided to write out the per-tile metadata (i.e. the write out stage may comprise dedicated write-out circuitry for the processing stage). Additionally or alternatively, write out circuitry that is already provided in the graphics processing pipeline may be used to write out the per-tile metadata, such as for example, write out circuitry provided and used to write out (each tile of) the rendered fragment data from the tile buffer to external memory (i.e. the write out stage may comprise the tile buffer write out stage).

In an embodiment, the rendered fragment data stored in the tile buffer may also be written out to a or the external memory, e.g. by the tile buffer write out stage (which may or may not be the same write out stage that writes out per-tile metadata data to external memory). Thus, the graphics processing pipeline in an embodiment further comprises a write out stage configured to (be able to) write rendered fragment data to an external memory, and the method in an embodiment further comprises a write out stage writing the rendered fragment data to external memory.

In these embodiments, the write out stage that writes out the rendered fragment data will in an embodiment operate to write the data in the tile buffer (once the data in the tile buffers is complete) out to external (main) memory (e.g. to a frame buffer), as is known in the art. This may include, as is known in the art, downsampling (averaging), either in a fixed or in a variable fashion, the data values in the tile buffer to the final output (pixel) value to be written to the main memory (e.g. frame buffer) and/or other output, if desired.

(However, as discussed above, in some embodiments it is not necessary to write out the rendered fragment data stored in the tile buffer to the main memory, for example, where only the metadata is required for further processing (and the data stored in a tile is not needed externally to the graphics processing pipeline). Thus, the write out stage can be configured not to write out the rendered fragment data stored in the tile buffer to external memory.)

In an embodiment, the per-tile metadata is generated before the rendered fragment data (e.g. tile) stored in the tile buffer is written to external memory (e.g. tile buffer). The rendered fragment data stored in the tile buffer may be written out to external memory at the same time as, or at a different time to, writing the per-tile metadata out to external memory. The rendered fragment data and the per-tile metadata may be written out to the same or different external memories. The rendered fragment data and the related per-tile metadata may be written out to adjacent (contiguous) locations in external memory, but this need not be the case.

In one embodiment, the per-tile metadata may be used to control the writing out of the rendered fragment data to external memory. For example, the writing out of the rendered fragment data may be delayed or suppressed based on the value of the per-tile metadata, and/or the location in external memory to which the rendered fragment data is written may be controlled based on the value of the per-tile metadata, and/or a further processing operation, e.g. to modify the values of the rendered fragment data, may be controlled based on the value of the per-tile metadata.

In one embodiment, fixed function write out of a specific tile and/or render target from the tile buffer can be prevented. Preventing the fixed function write out of a tile and/or render target could be performed on a static basis (i.e. predetermined to statically have write out disabled), or it could be preventable on a dynamic basis (in use). Similarly, the fixed function write out of a tile and/or render target could be, e.g., prevented across all the tiles in common, or selected dynamically, on a per tile basis.

Once the per-tile metadata has been written out the external memory or to a local memory, it may be used (e.g. by the graphics processor or by a central processing unit) in any manner as desired. In one embodiment, the per-tile metadata is used in the form in which it is output. However, in another embodiment, the per-tile metadata may be processed further (e.g. by the graphics processor or by a central processing unit) before being used. For example, metadata relating to groups of tiles, or the whole frame, may be generated using the per-tile metadata generated for the groups of tiles or the whole frame.

The graphics processing pipeline may also contain any other suitable and desired processing stages that a graphics processing pipeline may contain such as an early depth (or an early depth and stencil) tester, a late depth (or depth and stencil) tester, a blender, etc.

The technology described herein can be used for all forms of output that a graphics processing pipeline may be used to generate, such as frames for display, render-to-texture outputs, etc.

In an embodiment, the various functions of the technology described herein are carried out on a single graphics processing platform that generates and outputs the rendered fragment data that is, e.g., written to the frame buffer for the display device.

In some embodiments, the graphics processing pipeline comprises, and/or is in communication with, one or more memories and/or memory devices that store the data described herein, and/or store software for performing the processes described herein. The graphics processing pipeline may also be in communication with a host microprocessor, and/or with a display for displaying images based on the data generated by the graphics processor.

The technology described herein can be implemented in any suitable system, such as a suitably configured microprocessor based system. In an embodiment, the technology described herein is implemented in a computer and/or micro-processor based system.

The various functions of the technology described herein can be carried out in any desired and suitable manner. For example, the functions of the technology described herein can be implemented in hardware or software, as desired. Thus, for example, unless otherwise indicated, the various functional elements, stages, and "means" of the technology described herein may comprise a suitable processor or processors, controller or controllers, functional units, circuitry, processing logic, microprocessor arrangements, etc., that are operable to perform the various functions, etc., such as appropriately dedicated hardware elements and/or programmable hardware elements that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuitry, etc., if desired.

Furthermore, any one or more or all of the processing stages of the technology described herein may be embodied as processing stage circuitry, e.g., in the form of one or more fixed-function units (hardware, such as electronic circuits) (processing circuitry), and/or in the form of programmable processing circuitry (programmable circuits) that can be programmed to perform the desired operation. Equally, any one or more of the processing stages and processing stage circuitry of the technology described herein may be provided as a separate circuit element to any one or more of the other processing stages or processing stage circuitry, and/or any one or more or all of the processing stages and processing stage circuitry may be at least partially formed of shared processing circuitry.

Subject to any hardware necessary to carry out the specific functions discussed above, the graphics processing pipeline can otherwise include any one or more or all of the usual functional units, etc., that graphics processing pipelines include.

It will also be appreciated by those skilled in the art that all of the described embodiments of the technology described herein can, and in an embodiment do, include, as appropriate, any one or more or all of the features described herein.

The methods in accordance with the technology described herein may be implemented at least partially using software e.g. computer programs. It will thus be seen that when viewed from further embodiments the technology described herein provides computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a graphics processor, renderer or microprocessor system comprising a data processor causes in conjunction with said data processor said processor, renderer or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non-transitory medium, such as a computer readable medium, for example, diskette, CD-ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

Embodiments of the technology described herein will now be described in the context of the processing of computer graphics for display.

As is known in the art, and as discussed above, when a computer graphics image is to be displayed, it is usually first defined as a series of primitives (polygons), which primitives are then divided (rasterised) into graphics fragments for graphics rendering in turn. During a normal graphics rendering operation, the renderer will modify the (e.g.) colour (red, green and blue, RGB) and transparency (alpha, a) data associated with each fragment so that the fragments can be displayed correctly. Once the fragments have fully traversed the renderer, then their associated data values are stored in memory, ready for output for display.

FIGS. 1 to 7 show the main elements of the graphics processing system that are relevant to the operation of the technology described herein. As will be appreciated by those skilled in the art there may be other elements of the graphics processing system that are not illustrated in FIGS. 1 to 7. It should also be noted here that FIGS. 1 to 7 are only schematic, and that, for example, in practice the shown functional units and pipeline stages may share significant hardware circuits, even though they are shown schematically as separate stages in FIGS. 1 to 7.

FIG. 1 shows schematically a conventional graphics processing system including a graphics processing pipeline and an external "main" memory 5. The graphics processing pipeline shown in FIG. 1 is a tile-based renderer and will thus, as is known in the art, produce tiles of a render output data array, such as an output frame to be generated. In the present embodiment, each tile comprises, e.g., a 16×16 or 32×32 array of sampling positions.

The render output data array may, as is known in the art, typically be an output frame intended for display on a display device, such as a screen or printer, but may also, for example, comprise intermediate data intended for use in later rendering passes (also known as a "render to texture" output), etc.

As shown in FIG. 1, the graphics processing system includes a pixel generation stage 1, a pixel blending stage 2, a tile buffer 3, a memory write-back mechanism 4, and an external "main" memory 5.

The pixel generation stage 1 operates, as is known in the art, to generate rendered fragment data. As is known in the art, this stage will include a number of processing stages, such as for example, a rasterisation stage, an early Z (depth) and stencil test stage, a renderer (fragment shading) stage, a late Z (depth), a stencil test stage, etc.

The pixel blending stage 2 operates, as is known in the art, to write the rendered fragment data to the frame buffer 3, and to subject the fragments to any necessary blending operations with fragment data already stored in the tile buffer 3. Any other remaining operations necessary on the fragments, such as dither, etc. (not shown) are also carried out at this stage.

The (blended) fragment data (values) are written to the tile buffer 3 from where they can, for example, be output to a frame buffer in external memory 5 for display by write-back mechanism 4. (The depth value for an output fragment may also be written appropriately to a Z-buffer, e.g. within the tile buffer 3.) (The tile buffer will store, as is known in the art, colour and depth buffers that store an appropriate colour, etc., or Z-value, respectively, for each data position that the buffers represent (in essence for each data position of a tile that is being processed).) These buffers store, as is known in the art, an array of fragment data that represents part (a tile) of the overall render output (e.g. image to be displayed).

The tile buffer 3 is provided as part of RAM that is located on (local to) the graphics processing pipeline (chip).

The data from the tile buffer 3 may be output (written back) to an external memory 5, such as a frame buffer of a display device (not shown) by write-back mechanism 4. (The display device could comprise, e.g., a display comprising an array of pixels, such as a computer monitor or a printer.) In the present embodiment, the external memory resides on separate chip to the graphics processing pipeline.

The write-back mechanism 4 may downsample the fragment data stored in the tile buffer 3 to the appropriate resolution for the output buffer (device) (i.e. such that an array of pixel data corresponding to the pixels of the output device is generated), to generate output values (pixels) for output to the output buffer.

Once a tile of the render output has been processed (and its data optionally exported to the main memory 5 (e.g. to a frame buffer in main memory 5 (not shown)) for storage), the next tile is then processed, and so on, e.g. until sufficient tiles have been processed to generate the entire render output (e.g. frame (image) to be displayed). The process is then repeated for the next render output (e.g. frame) and so on.

Other arrangements for the graphics processing pipeline would, of course, be possible.

The above describes certain features of the operation of the graphics processing system shown in FIG. 1. Further features of the operation of the graphics processing system in accordance with embodiments of the technology described herein will now be described with reference to FIGS. 2 to 7. Elements of FIGS. 2 to 7 that correspond to elements of FIG. 1 operate in a corresponding manner, with a number of modifications and additions that will now be described.

Figure 2:
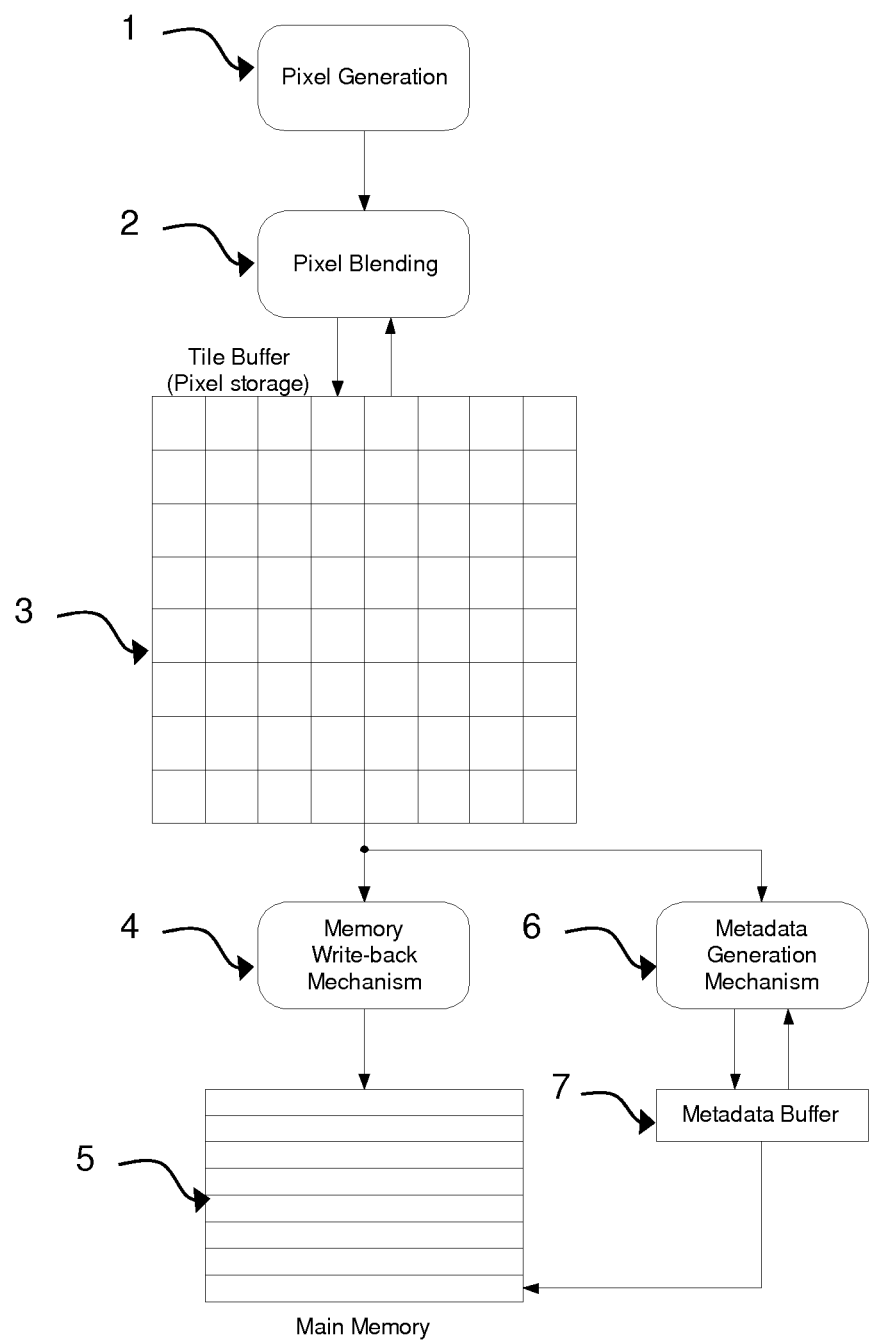
FIGS. 2 to 8 show schematically graphics processing systems that operate in accordance with embodiments of the technology described herein.

FIG. 2 shows schematically a modified graphics processing system that operates in accordance with an embodiment of the technology described herein.

A metadata generation mechanism 6 is provided on (local to) the graphics processing pipeline (chip). An optional metadata buffer 7 is also provided on (local to) the graphics processing pipeline (chip), for storing data generated by the metadata generation mechanism 6.

In the present embodiment, data requested from the tile buffer 3 during memory write-back are used as an input to the metadata generation mechanism 6. Fragment data read from the tile buffer 3 may also be taken as an input to metadata generation mechanism 6. The metadata generation mechanism 6 generates per-tile metadata using the input rendered fragment data. Intermediate values of the (or used in generating the) metadata may accumulate in the metadata buffer 7 before the final value is written to the main (external) memory 5.

Figure 3:
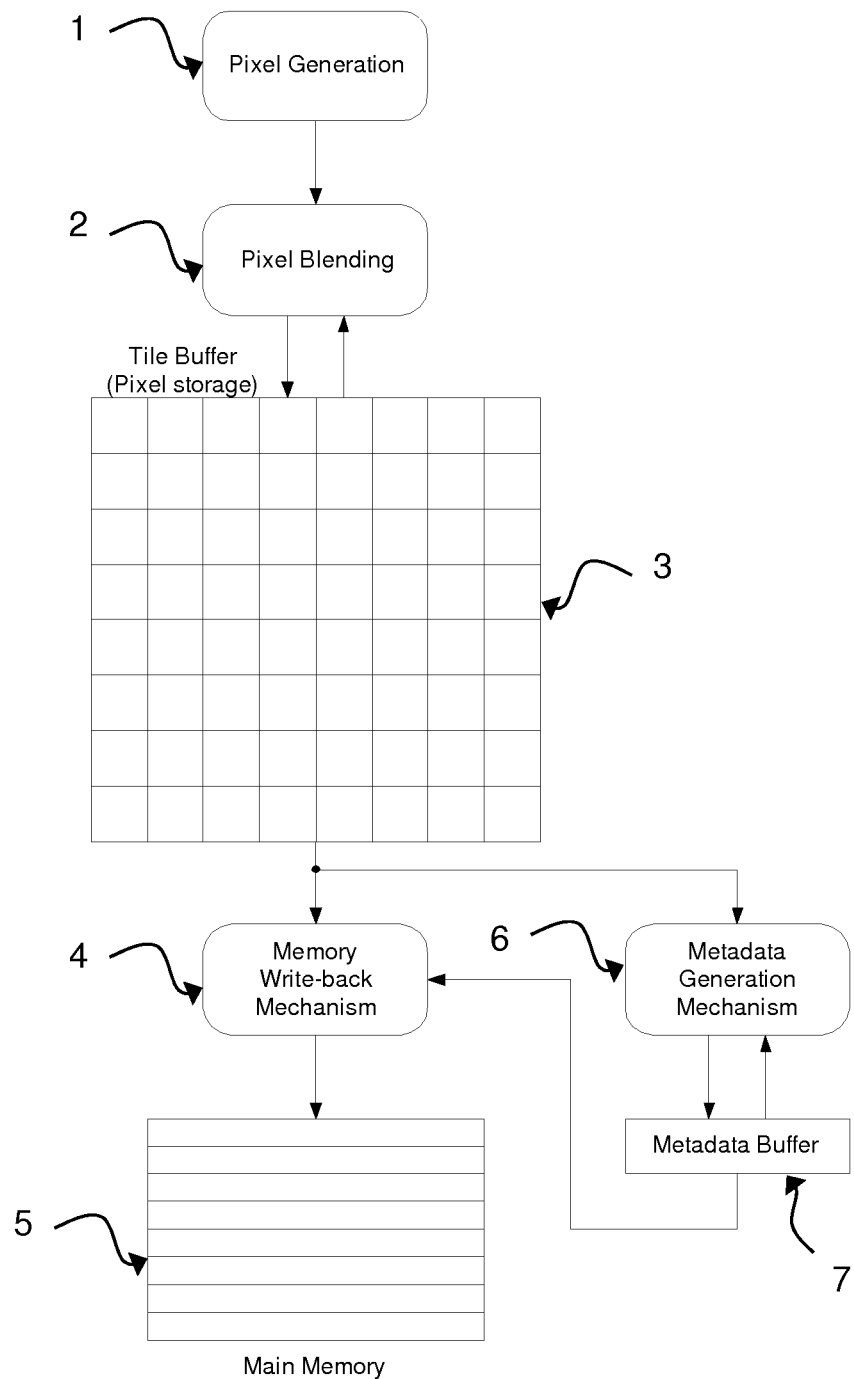

FIG. 3 shows schematically another graphics processing system that operates in accordance with an embodiment of the technology described herein. The graphics processing system of FIG. 3 is similar to the system of FIG. 2, except the final metadata is passed to the memory write-back mechanism 4 for output to main (external) memory 5. This then means that the metadata generation mechanism 6 does not require its own circuitry for reading and writing to main memory 5.

In an embodiment, the metadata is used to control the operation of the write-back mechanism 4. In one embodiment, depending on the value of the per-tile metadata, the write-back mechanism 4 delays and/or suppresses the writing of the rendered fragment data from the tile buffer 3 to the main (external) memory 5; and/or directs the data to one or more alternative addresses in the main memory 5; and/or modify the rendered fragment data values.

It should be noted that while FIGS. 4 to 7 show write-back arrangements similar to the write-back arrangement of FIG. 3, the write back arrangement of FIG. 2 (i.e. where the per-tile metadata is written directly from the metadata generation mechanism 6/metadata buffer 7 to the main memory 5) may be used in any of the described/illustrated embodiments.

Figure 4:
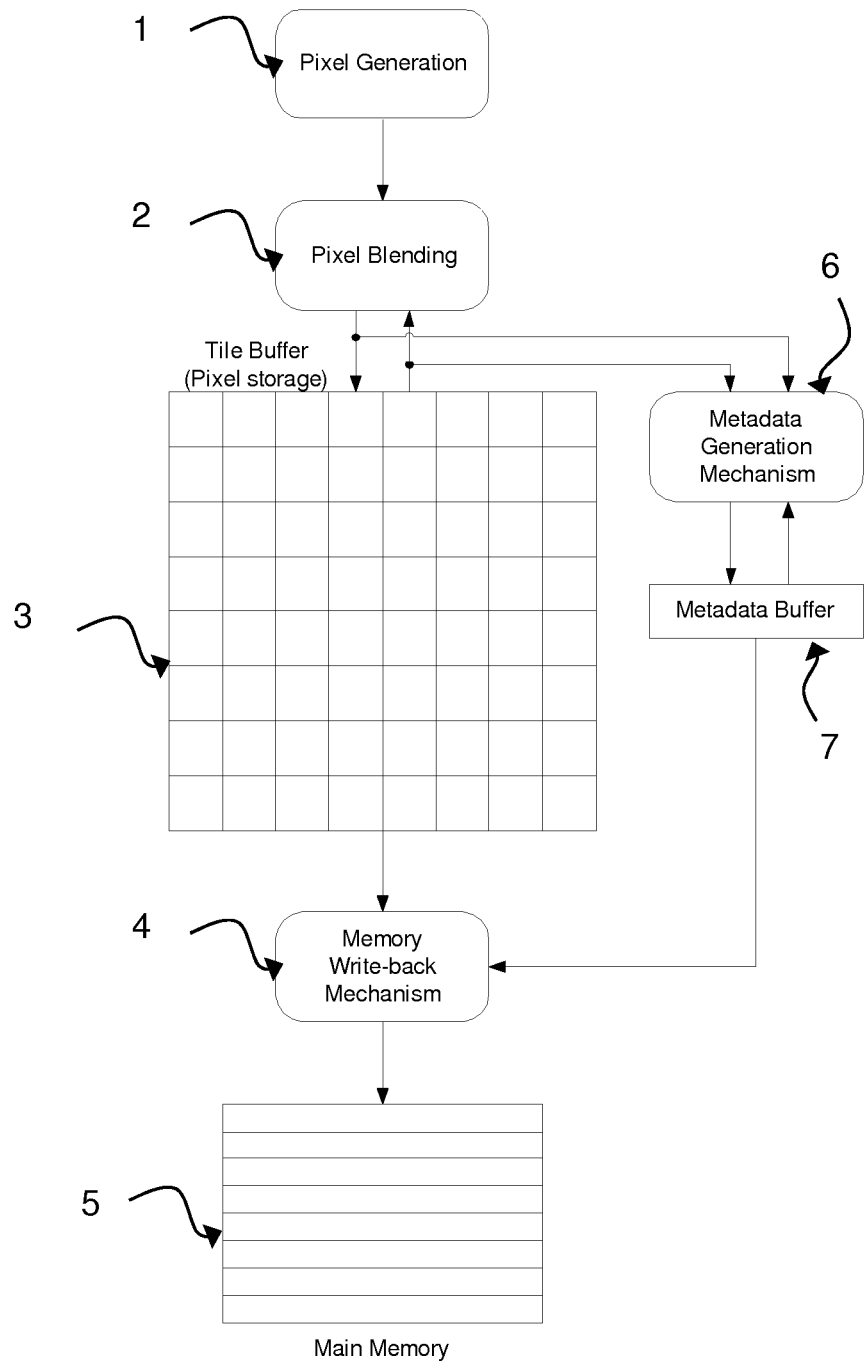

FIG. 4 shows schematically a graphics processing system that operates in accordance with an embodiment of the technology described herein. In this embodiment, rendered graphics fragment data that is written by pixel blending stage 2 to the tile buffer 3 are taken as an input to metadata generation mechanism 6. Fragment data read from the tile buffer 3 may also be taken as an input to metadata generation mechanism 6. In this embodiment, each data value in the tile buffer 3 can be updated multiple times, so the metadata generation mechanism 6 is configured to process the input data to generate per-tile metadata by keeping a running progress of the calculated value in the metadata buffer 7. In this embodiment, the per-tile metadata is made available as soon as the pixel blending stage 2 has finished writing the tile in question to the tile buffer 3.

Figure 5:
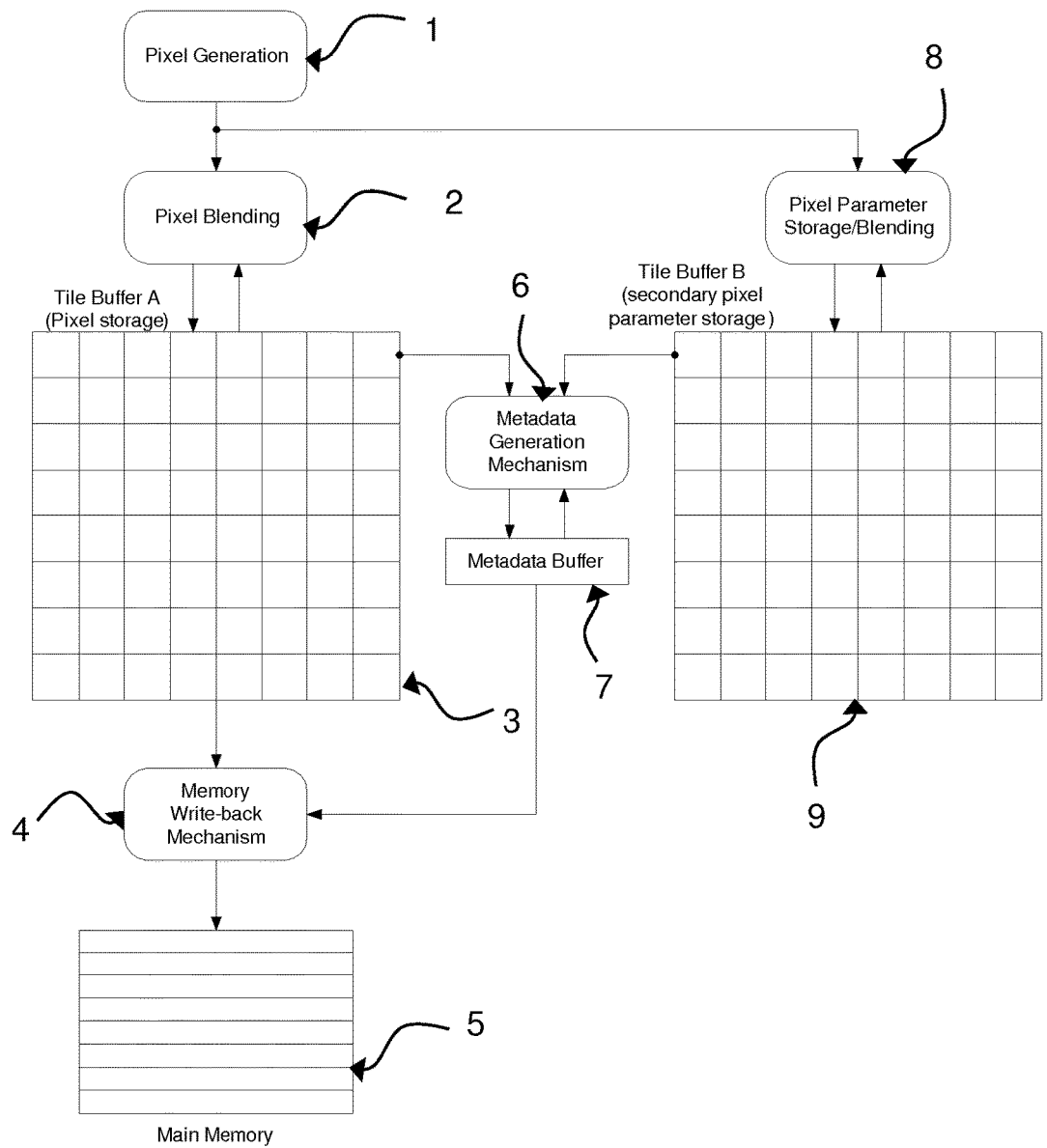

FIG. 5 shows schematically a graphics processing system that operates in accordance with an embodiment of the technology described herein. In this embodiment, (blended) fragment data (values) are written to the tile buffer 3, as described above, and secondary pixel parameters are also written to tile buffer 9 via stage 8. In general, one or more secondary pixel parameters may be generated by pixel generation stage 1, and stored in one or more tile buffers. In one embodiment, the secondary pixel parameter comprises depth values for each data position (which are used in so-called Z-buffered rendering). In the present embodiment, the data stored in (or to be stored in) the buffer 9 are used as an input to metadata generation mechanism 6.

Figure 6:
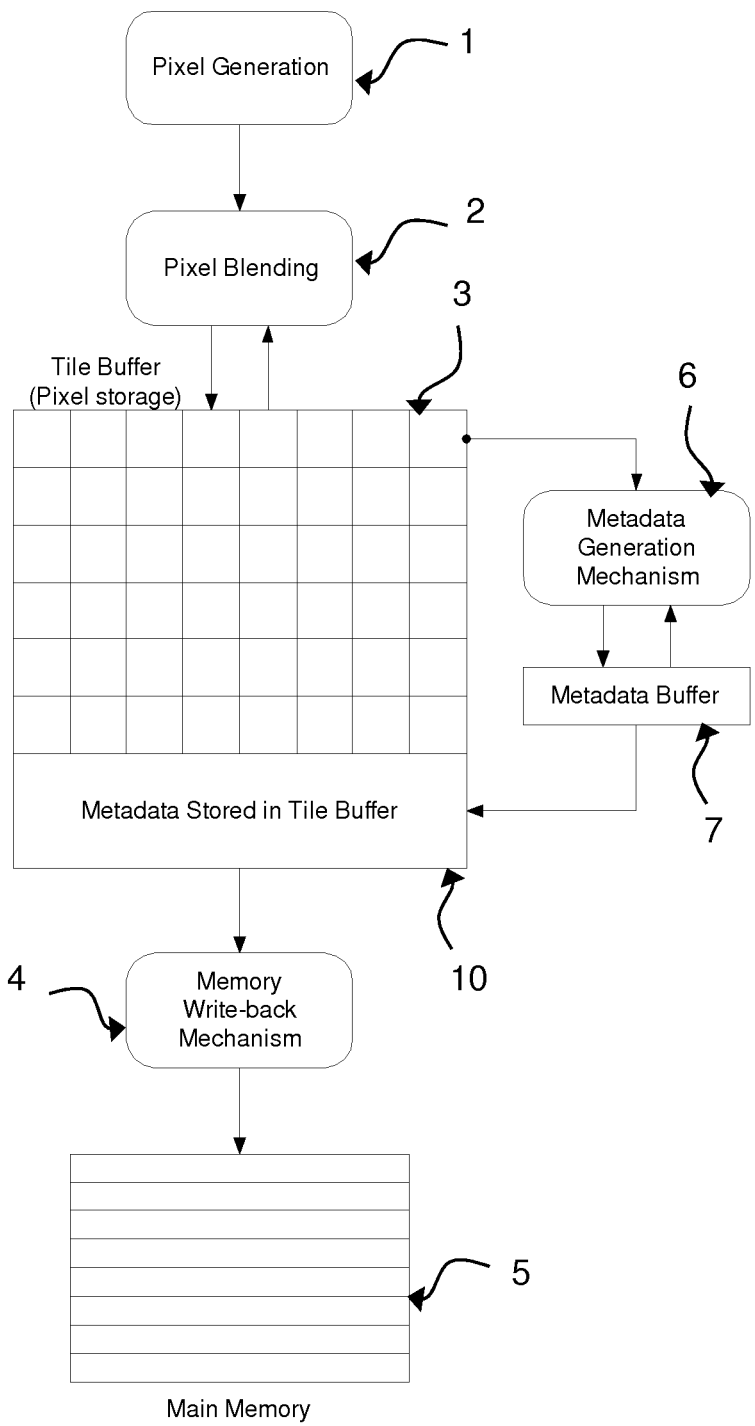

FIG. 6 shows schematically a graphics processing system that operates in accordance with an embodiment of the technology described herein. In this embodiment, the metadata is stored in a portion 10 of the tile buffer 3. This is particularly useful where, for example, the metadata is relatively large so that it is undesirable to store all of the metadata in a separate buffer, such as the metadata buffer 7. In this embodiment, if certain portions of the data in the tile buffer 3 (or buffers 3, 9) are only required at early stages of the metadata generation mechanism 6 processing operation, the metadata is stored in the tile buffer 3 overwriting those portions of data (e.g. overwriting data values that have already been processed). In the present embodiment, as some of the data stored in the tile buffer is destroyed, only the metadata is written back to the main memory 5.

In an embodiment, the metadata generation mechanism 6 can read and/or write metadata values stored in the tile buffer 3. In an embodiment, the metadata generation mechanism 6 may employ the pixel blending stage 2 to write and/or update metadata values in the tile buffer 3.

Figure 7:
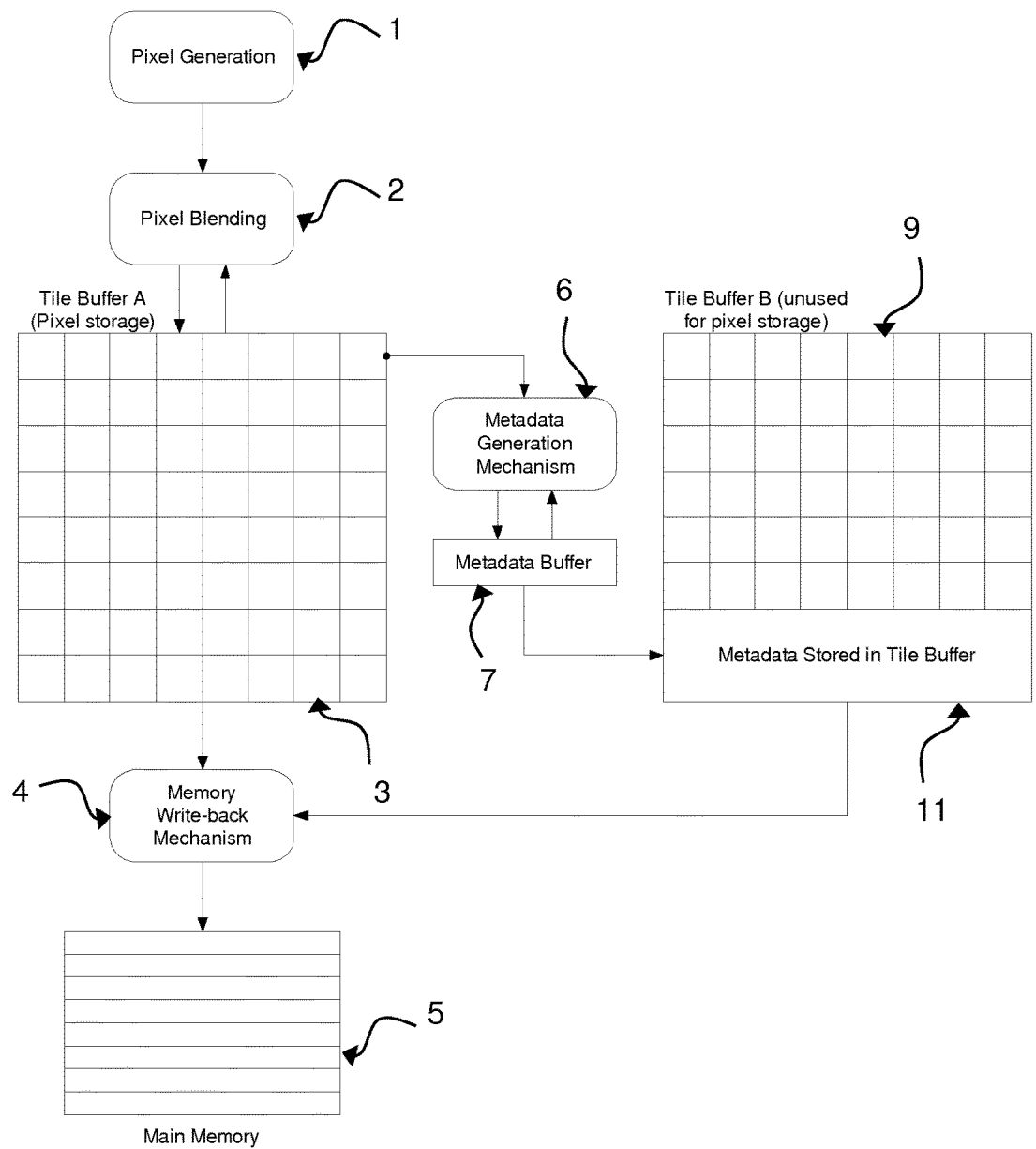

FIG. 7 shows schematically a graphics processing system that operates in accordance with an embodiment of the technology described herein. In this embodiment, the metadata is stored in a portion 11 of the secondary tile buffer 9. In this embodiment, empty regions of the secondary tile buffer 9 may be used to store the metadata. This then means that there are no ordering constraints on the generation of the metadata, and the original pixel data stored in tile buffer 3 is available to be written back to main memory 5.

Figure 8:
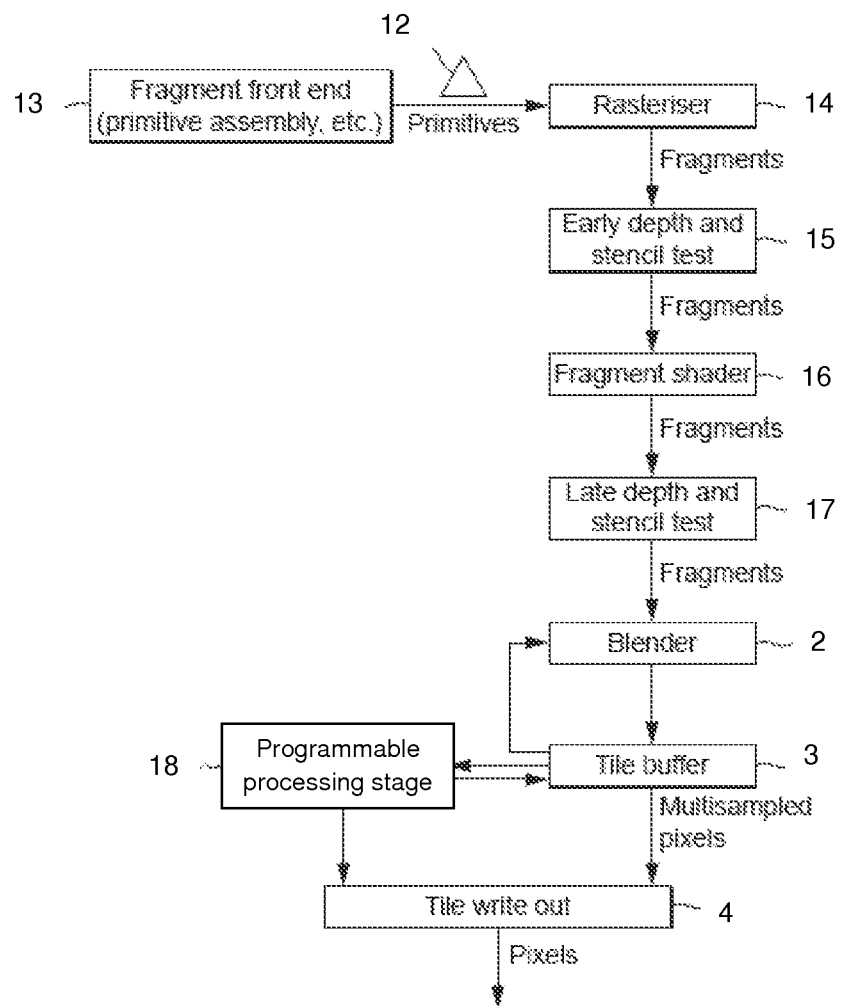

FIG. 8 shows schematically more detail of a tile-based graphics processing pipeline that may operate in accordance with the technology described herein.

(FIG. 8 shows the main elements and pipeline stages of the graphics processing pipeline that are relevant to the operation of the present embodiment. As will be appreciated by those skilled in the art there may be other elements of the graphics processing pipeline that are not illustrated in FIG. 8. It should also be noted here that FIG. 8 is only schematic, and that, for example, in practice the shown functional units and pipeline stages may share significant hardware circuits, even though they are shown schematically as separate stages in FIG. 8. It will also be appreciated that each of the stages, elements and units, etc., of the graphics processing pipeline as shown in FIG. 8 may be implemented as desired and will accordingly comprise, e.g., appropriate circuitry and/or processing logic, etc., for performing the necessary operation and functions.)

FIG. 8 shows schematically the pipeline stages after the graphics primitives (polygons) 12 for input to the rasterisation process have been generated. Thus, at this point the graphics data (the vertex data) has undergone fragment frontend operations 13, such as transformation and lighting operations (not shown), and a primitive set-up stage (not shown) to set-up the primitives to be rendered, in response to the commands and vertex data provided to the graphics processor, as is known in the art.

As shown in FIG. 8, this part of the graphics processing pipeline includes a number of stages, including a rasterisation stage 14, an early Z (depth) and stencil test stage 15, a renderer in the form of a fragment shading stage 16, a late Z (depth) and stencil test stage 17, a blending stage 2, a tile buffer 3 and a downsampling and writeout (multisample resolve) stage 4.

The rasterisation stage 14 of the graphics processing pipeline operates, as is known in the art, to rasterise the primitives making up the render output (e.g. the image to be displayed) into individual graphics fragments for processing. To do this, the rasteriser 14 receives graphics primitives 12 for rendering, rasterises the primitives to sampling points and generates graphics fragments having appropriate positions (representing appropriate sampling positions) for rendering the primitives.

The fragments generated by the rasteriser are then sent onwards to the rest of the pipeline for processing.

The early Z/stencil stage 15 performs, is known in the art, a Z (depth) test on fragments it receives from the rasteriser 14, to see if any fragments can be discarded (culled) at this stage. To do this, it compares the depth values of (associated with) fragments issuing from the rasteriser 14 with the depth values of fragments that have already been rendered (these depth values are stored in a depth (Z) buffer that is part of the tile buffer 3) to determine whether the new fragments will be occluded by fragments that have already been rendered (or not). At the same time, an early stencil test is carried out.

Fragments that pass the fragment early Z and stencil test stage 15 are then sent to the fragment shading stage 16. The fragment shading stage 16 performs the appropriate fragment processing operations on the fragments that pass the early Z and stencil tests, so as to process the fragments to generate the appropriate rendered fragment data, as is known in the art.

This fragment processing may include any suitable and desired fragment shading processes, such as executing fragment shader programs on the fragments, applying textures to the fragments, applying fogging or other operations to the fragments, etc., to generate the appropriate fragment data, as is known in the art. In the present embodiment, the fragment shading stage 16 is in the form of a shader pipeline (a programmable fragment shader), but other arrangements, such as the use also or instead of fixed function fragment shading units would be possible, if desired.

There is then a "late" fragment Z and stencil test stage 17, which carries out, inter alia, an end of pipeline depth test on the shaded fragments to determine whether a rendered fragment will actually be seen in the final image. This depth test uses the Z-buffer value for the fragment's position stored in the Z-buffer in the tile buffers 3 to determine whether the fragment data for the new fragments should replace the fragment data of the fragments that have already been rendered, by, as is known in the art, comparing the depth values of (associated with) fragments issuing from the fragment shading stage 16 with the depth values of fragments that have already been rendered (as stored in the depth buffer). This late fragment depth and stencil test stage 17 also carries out any necessary "late" alpha and/or stencil tests on the fragments.

The fragments that pass the late fragment test stage 17 are then subjected to, if required, any necessary blending operations with fragments already stored in the tile buffer 3 in the blender 2. Any other remaining operations necessary on the fragments, such as dither, etc. (not shown) are also carried out at this stage.

Finally, the (blended) output fragment data (values) are written to the tile buffer 3 from where they can, for example, be output to a frame buffer for display. The depth value for an output fragment is also written appropriately to a Z-buffer within the tile buffer 3. (The tile buffer will store, as is known in the art, colour and depth buffers that store an appropriate colour, etc., or Z-value, respectively, for each sampling point that the buffers represent (in essence for each sampling point of a tile that is being processed).)

The data from the tile buffer 3 is input to a downsampling (multisample resolve) write out unit 4, and thence output (written back) to an external memory output buffer, such as a frame buffer of a display device (not shown). (The display device could comprise, e.g., a display comprising an array of pixels, such as a computer monitor or a printer.)

The downsampling and writeout unit 4 downsamples the fragment data stored in the tile buffer 3 to the appropriate resolution for the output buffer (device) (i.e. such that an array of pixel data corresponding to the pixels of the output device is generated), to generate output values (pixels) for output to the output buffer.

Once a tile of the render output has been processed and its data exported to main memory 5 (e.g. to a frame buffer in main memory 5) for storage, the next tile is then processed, and so on, until sufficient tiles have been processed to generate the entire render output (e.g. frame (image) to be displayed). The process is then repeated for the next render output (e.g. frame) and so on.

In the embodiment shown in FIG. 8, the graphics processing pipeline includes a metadata generation mechanism in the form of programmable processing stage 18 that can read stored values in the tile buffer 3 to perform processing operations on those values, and then write the per-tile metadata either back to the tile buffer 3 or out to main memory 5 via the tile write out unit 4.

In embodiments where the metadata generation unit 6 comprises a programmable unit 18, the selection of inputs, processing, and outputs are controlled by a program. In this embodiment, the programmable unit has access to all the sampling positions (pixels) in the tile buffer 3. This allows complete control of the inputs to the metadata generation mechanism 6, the processing operation, and where the output metadata is stored.

Alternatively, the metadata generation mechanism 6 may comprise a fixed-function unit dedicated to one or more single purposes, with or without a local buffer 7 for accumulating working values.

Where the input image is not an integer multiple of the number of tiles, tiles may exist at the edges of the image that are only partially populated with valid pixels. In the present embodiment, the pixel generation 1 and write-back 4 mechanisms have the ability to consider only those pixels inside the generated image. Equally, the metadata generation mechanism 6 is configured in a similar way, i.e. so as to only consider the valid pixels.

In another embodiment, the metadata generation mechanism 6 is configured so as to process every tile in the same manner, i.e. regardless of whether all the pixels are valid pixels. Processing the metadata in this manner may be more efficient in some cases because it can avoid additional complexity. For example, generating an average for a full tile requires a single constant division operation, which is relatively easily provided in hardware, especially if the factor is a power of two. On the other hand, division by arbitrary numbers can be relatively expensive in hardware. In this case it may be more efficient for the metadata generation unit to be configured to simply divide by a fixed number (e.g. the number of sampling points or pixels in a tile), and then to use software to later adjust the calculated value using the correct divisor for the partially populated edge tiles.

The metadata generation mechanism 6 may or may not write out the per-tile metadata, e.g. to the external memory 5. For example, the per-tile metadata may not be written out, but instead kept in metadata buffer 7 ready for a further processing pass.

The metadata generation mechanism 6 may be reset to a known state before processing a new tile, or it may load a value from main memory 5, allowing accumulation of values over several tiles and/or on the same tile over several frames.

Examples of per-tile metadata include, but are not limited to the following.

Histogram generation: the number of sampling positions (pixels) in a tile corresponding to various parameters (e.g. luminous intensity levels) is histogrammed. The number of histogram bins required, and/or the ranges for each bin can be supplied to the metadata generation mechanism 6. A luminance histogram may be used for dynamic contrast and high-dynamic range display. A frequency histogram may be used in dynamic display processing, and in encoding of display streams.

Transparency information: the per-tile metadata may indicate whether all sampling positions (pixels) of a tile are completely opaque or completely transparent (or a mix of the two), and if this is the case, some of the subsequent processing operations may be skipped. The per-tile metadata may take the form of a histogram, or a simple bitmask indicating the presence or absence of sampling positions (pixels) in each class. The per-tile metadata may also indicate pixels which are "almost fully" opaque or "almost fully" transparent, since the differences with the fully opaque or transparent cases may not be visible in certain circumstances. In this case, programmable thresholds for opaque and transparent sampling position (pixel) detection can be supplied to the metadata generation mechanism 6.

The per-tile metadata may indicate minimum and maximum values for properties of sampling positions (pixels) (e.g. luminance, depth, etc.) of a tile.

The per-tile metadata may indicate a total value of a property of the sampling positions (pixels) in a tile, such as the total luminance, colour, etc.

The per-tile metadata may indicate an average value of a property of the sampling positions (pixels) in a tile. The processing operation will involve summing pixel values followed by dividing by the number of sampling positions (pixels) summed. This is equivalent to a box filter with size the same as the tile. The average colour of a tile may be used for ambient colour enhancement in a display device.

Modification flag: If any changes at all (or if sufficiently few changes) are made to the tile, a single flag is set. For example, writing the rendered fragment data to the tile buffer (e.g. when modifying an existing image) may or may not change existing data stored in the tile buffer, and the per-tile metadata may indicate whether or not any such change (or if only sufficiently minor changes) has been made. This metadata may be used, e.g., to suppress the output of the rendered fragment data to external memory 5 (e.g. when no changes have been made), to save bandwidth.

The metadata may be generated from rendered fragment data (e.g. depth values) which is not written out to main memory at all.

Domain transformations: the tile data may be transformed from a spatial grid into another domain, such as 2D spatial frequency using DCT, wavelet, or other similar techniques.

It is also possible to generate multiple different types of metadata from one pass over the data in the tile buffer, which may be written out separately or together. Any of the above operations may be combined, for example a frequency domain transformation can be combined with the histogram function to create a frequency histogram. In the hardware-assisted embodiments, multiple different types of per-tile metadata can be generated at the same time.

The per-tile metadata may further be processed by the graphics processing system, central processing unit, or other processing elements, e.g. to add up contributions from multiple tiles.

It can be seen from the above that the technology described herein, in its embodiments at least, provides a low power and bandwidth method and system for generating per-tile metadata. This is achieved in embodiments of the technology described herein at least by providing a processing unit within a graphics processing pipeline that is operable to receive and process rendered fragment data to generate per-tile metadata.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

What is claimed is:

1. A tile based graphics processing pipeline comprising:
   rasterisation circuitry that rasterises input primitives to generate graphics fragments to be processed;
   rendering circuitry that processes the graphics fragments generated by the rasterisation circuitry to generate rendered fragment data;
   a tile buffer configured to store the rendered fragment data locally within the graphics processing pipeline;
   processing stage circuitry operable to receive the rendered fragment data from within the graphics processing pipeline, and to perform a processing operation using the rendered fragment data to generate per-tile metadata within the graphics processing pipeline;
   write out circuitry configured to write the rendered fragment data from the tile buffer within the graphics processing pipeline to a frame buffer in external memory and
   to write the per-tile metadata from within the graphics processing pipeline to the external memory;
   wherein the per-tile metadata comprises one or more of: (i) a histogram; (ii) a bitmap or a bitmask; (iii) minimum or maximum values; (iv) a total value; (v) an average value; (vi) a similarity flag; and (vii) a modification flag,
   wherein the processing stage circuitry is operable to receive the rendered fragment data as that data is being written from the tile buffer within the graphics processing pipeline to the frame buffer in the external memory or wherein the processing stage circuitry is operable to receive the rendered fragment data as that data is being written to the tile buffer within the graphics processing pipeline; and
   wherein the processing stage circuitry is configured to write the per-tile metadata to a local buffer within the graphics processing pipeline or to the tile buffer within the graphics processing pipeline, and wherein the write out circuitry is configured to write the per-tile metadata from the local buffer within the graphics processing pipeline or from the tile buffer within the graphics processing pipeline to the frame buffer in the external memory.

2. The graphics processing pipeline of claim 1, wherein the processing stage circuitry comprises one or more fixed-function units.

3. The graphics processing pipeline of claim 1, wherein the processing stage circuitry comprises programmable processing circuitry operable under control of graphics program instructions to perform the processing operation using the rendered fragment data.

4. The graphics processing pipeline of claim 1, wherein the per-tile metadata relates to one or more of: (i) luminosity; (ii) transparency; (iii) depth; (iv) domain transformed information; and (v) color.

5. The graphics processing pipeline of claim 1, wherein the graphics processing pipeline is configured to use the per-tile metadata to control the writing of the rendered fragment data to the external memory.

6. The graphics processing pipeline of claim 1, wherein the processing stage circuitry is intermediate the tile buffer and the external memory.

7. The graphics processing pipeline of claim 1, wherein the processing stage circuitry is operable to receive the rendered fragment data without that data being written to the external memory.

8. A method of operating a tile based graphics processing pipeline that comprises:
a plurality of processing stages, including at least a rasteriser that rasterises input primitives to generate graphics fragments to be processed, and a renderer that processes the graphics fragments generated by the rasteriser to generate rendered fragment data;
a tile buffer configured to store the rendered fragment data locally within the graphics processing pipeline;
a processing stage operable to receive the rendered fragment data from within the graphics processing pipeline, and to perform a processing operation using the rendered fragment data to generate per-tile metadata;
a write out stage configured to write the rendered fragment data from the tile buffer within the graphics processing pipeline to a frame buffer in external memory and
to write the per-tile metadata from within the graphics processing pipeline to the external memory;
the method comprising:
storing the rendered fragment data locally within the graphics processing pipeline in the tile buffer;
writing the rendered fragment data from the tile buffer within the graphics processing pipeline to the frame buffer in the external memory;
the processing stage receiving the rendered fragment data as that data is being written from the tile buffer within the graphics processing pipeline to the frame buffer in the external memory or the processing stage circuitry receiving the rendered fragment data as that data is being written to the tile buffer within the graphics processing pipeline;
the processing stage performing a processing operation using the rendered fragment data to generate the per-tile metadata within the graphics processing pipeline; and
writing the per-tile metadata to a local buffer within the graphics processing pipeline or to the tile buffer within the graphics processing pipeline, and the write out stage writing the per-tile metadata from the local buffer within the graphics processing pipeline or from the tile buffer within the graphics processing pipeline to the frame buffer in the external memory;
wherein the per-tile metadata comprises one or more of: (i) a histogram; (ii) a bitmap or a bitmask; (iii) minimum or maximum values; (iv) a total value; (v) an average value; (vi) a similarity flag; and (vii) a modification flag.

9. The method of claim 8, wherein the processing stage comprises one or more fixed-function units.

10. The method of claim 8, wherein the processing stage comprises a programmable processing stage, and wherein the method further comprises:
the programmable processing stage under control of graphics program instructions, performing the processing operation using the rendered fragment data.

11. The method of claim 8, wherein the per-tile metadata relates to one or more of: (i) luminosity; (ii) transparency; (iii) depth; (iv) domain transformed information; and (v) color.

12. The method of claim 8, further comprising:
using the per-tile metadata to control the writing of the rendered fragment data to the external memory.

13. The method of claim 8, wherein the processing stage is intermediate the tile buffer and the external memory.

14. The method of claim 8, wherein the processing stage circuitry is operable to receive the rendered fragment data without that data being written to the external memory.

15. A non-transitory computer readable storage medium storing computer software code which when executing on a processor performs a method of operating a tile based graphics processing pipeline that comprises:
a plurality of processing stages, including at least a rasteriser that rasterises input primitives to generate graphics fragments to be processed, and a renderer that processes the graphics fragments generated by the rasteriser to generate rendered fragment data;
a tile buffer configured to store the rendered fragment data locally within the graphics processing pipeline;
a processing stage operable to receive the rendered fragment data from within the graphics processing pipeline, and to perform a processing operation using the rendered fragment data to generate per-tile metadata within the graphics processing pipeline;
a write out stage configured to write the rendered fragment data from the tile buffer within the graphics processing pipeline to a frame buffer in external memory and
to write the per-tile metadata from within the graphics processing pipeline to the external memory;
the method comprising:
storing the rendered fragment data locally within the graphics processing pipeline in the tile buffer;
writing the rendered fragment data from the tile buffer within the graphics processing pipeline to the frame buffer in the external memory;
the processing stage receiving the rendered fragment data as that data is being written from the tile buffer within the graphics processing pipeline to the frame buffer in the external memory or the processing stage circuitry receiving the rendered fragment data as that data is being written to the tile buffer within the graphics processing pipeline;
the processing stage performing the processing operation using the rendered fragment data to generate the per-tile metadata within the graphics processing pipeline; and
writing the per-tile metadata to a local buffer within the graphics processing pipeline or to the tile buffer within the graphics processing pipeline, and the write out stage writing the per-tile metadata from the local buffer within the graphics processing pipeline or from the tile buffer within the graphics processing pipeline to the frame buffer in the external memory;
wherein the per-tile metadata comprises one or more of: (i) a histogram; (ii) a bitmap or a bitmask; (iii) minimum or maximum values; (iv) a total value; (v) an average value; (vi) a similarity flag; and (vii) a modification flag.

* * * * *